United States Patent Office 3,418,328
Patented Dec. 24, 1968

3,418,328
DICARBAMATES OF PYRIDINE-2,6-DIMETHANOL
Peter F. Juby, Syracuse, N.Y., assignor to Bristol-Myers Company, New York, N.Y., a corporation of Delaware
No Drawing. Filed July 1, 1965, Ser. No. 468,913
11 Claims. (Cl. 260—295)

ABSTRACT OF THE DISCLOSURE

Symmetrical dialkanoyl- and dibenzoyl-carbamates of various pyridine 2,6-dimenthanols are valuable agents for their anti-inflammatory properties.

BACKGROUND OF THE INVENTION (1) Field of the invention.—The pyridine methanol dicarbamates of the present invention are novel nontoxic compounds which in mammals exhibit anti-inflammatory activity which are free of the undesirable side effects caused by the steroids generally used for such purposes.

(2) Description of the prior art.—The compounds of the present invention are novel and heretofore untaught in the prior art.

SUMMARY OF THE INVENTION

The compounds of the present invention are characterized as having the formula

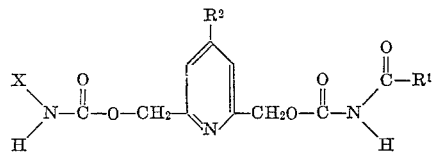

wherein $R^1$ is a member selected from the group consisting of (lower)alkyl and phenyl and X is a member selected from the group consisting of

and (lower)alkyl and $R^2$ is a member selected from the group consisting of hydrogen, chloro, bromo, iodo, fluoro, trifluoromethyl, (lower)alkyl and (lower)alkoxy; and a nontoxic pharmaceutically acceptable salt thereof.

DETAILED DESCRIPTION

This invention relates to new synthetic compounds having valuable anti-inflammatory properties and, more particularly, to symmetrical dialkanoyl- and dibenzoyl-carbamates of various pyridine 2,6-dimethanols and to mono-alkanoyl- and monobenzoyl-carbates of various pyridine 2,6-dimethanol mono-N-alkylcarbamates.

It was the object of the present invention to provide novel and nontoxic compounds which in mammals exhibit anti-inflammatory activity and prevent passive cutaneous anaphylaxis and which by their nature are free of the undesirable side-effects caused by the steroids generally used for such purposes. It was a further object of the present invention to provide nontoxic agents useful in the alleviation of the symptoms of such inflammatory processes as arthritis and purpura.

The objects of the present invention have been achieved by the provision, according to the present invention, of a member selected from the group consisting of compounds of the formula

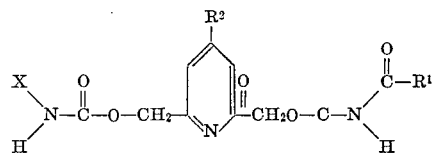

wherein $R^1$ is a member selected from the group consisting of (lower)alkyl and phenyl and X is a member selected from the group consisting of

and (lower)alkyl and $R^2$ is a member selected from the group consisting of hydrogen, chloro, bromo, iodo, fluoro, trifluoromethyl, (lower)alkyl and (lower)alkoxy; and nontoxic, pharmaceutically acceptable acid addition salts thereof including salts with organic and inorganic acids such as hydrochloric acid, hydrobromic acid, sulfuric acid, phosphoric acid, acetic acid, maleic acid, tartaric acid, citric acid, sulfamic acid, glycolic acid, succinic acid, ascorbic acid, and the like.

Preferred embodiments of the present invention are the compounds of the formula

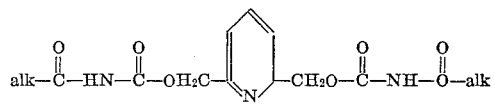

wherein alk represents (lower)alkyl; and the compounds of the formula

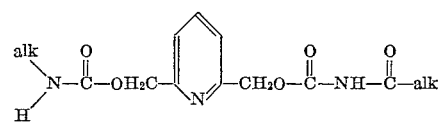

wherein alk represents (lower)alkyl; and the compounds of the formula

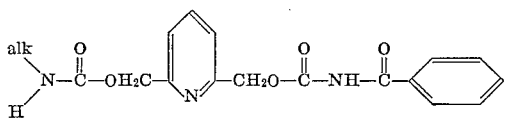

wherein alk represents (lower)alkyl; and the compounds of the formula

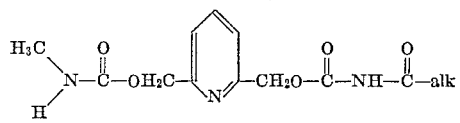

wherein alk represents (lower)alkyl.

The compounds of the present invention are synthesized from pyridine 2,6-dimethanols of the structure

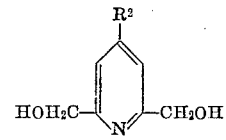

wherein R² has the meaning set forth above (and is preferably hydrogen) and their corresponding mono-N-alkyl-carbamates (and preferably mono-N-methylcarbamates) of the structure

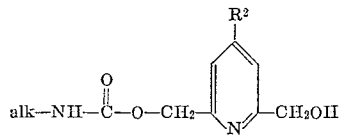

wherein alk represents (lower)alkyl (and preferably methyl) by reaction of such compounds with at least two moles or at least one mole, respectively, of a (lower) alkanoyl isocyanate or benzoyl isocyanate.

The pyridine 2,6-dimethanols used as starting materials are either disclosed in the literature or are prepared by known methods, e.g. by one of the following syntheses from the art:

(1) The corresponding 2,6-lutidines of the formula

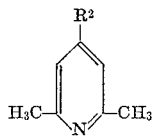

are oxidized by the procedure of Boekelheide et al., J. Amer. Chem. Soc. 76, 1286–1291 (1954);

(2) The corresponding di-aldehydes of the formula

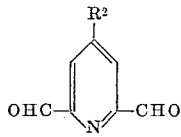

are oxidized by the procedure of Mathes et al., Berichte, 86, 584–588 (1953);

(3) Di-esters, illustrated as the diethyl ester, of the formula

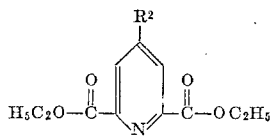

are reduced to the dimethanol by the use of a complex metal hydride (e.g. lithium aluminum hydride, di-isobutyl aluminum hydride, sodium borohydride) as disclosed, for example, by Barnes et al., J. Amer. Chem. Soc., 75, 3830–3831 (1953) or as used by Yoshida and Kumagae, Nippon Kagaku Zasshi, 81, 345–346 (1960 [C.A. 55, 6477 g, (1961)] for the preparation of 2,5-pyridinedimethanol, which is also called 2,5-bis(hydroxymethyl)-pyridine, from dimethyl isocinchomeronate.

The 2,6-lutidines of the first procedure given above are prepared by the use of the appropriate reagents in syntheses known to the art, e.g. the Hantzch synthesis in which an aliphatic aldehyde is condensed with acetoacetic ester in the presence of ammonia to form a dihydropyridine which is readily oxidized by nitric acid to a pyridine derivative of the formula

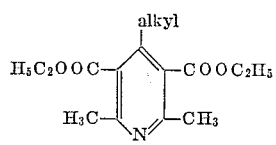

which is then readily hydrolyzed and decarboxylated to give the compound of the formula

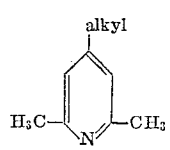

or the Chichibabin process [Bull. Soc. Chim. France, 3, 1607–32, (1936)] or the processes disclosed or discussed by Cislak in U.S. Patent 2,786,846 issued Mar. 26, 1957 or the procedures described in Pyridine and Its Derivatives, Part II, E. Klingsberg, Interscience, 1961, Chapter V, Alkyl and Aryl-pyridines, pp. 155–298 and the references cited therein.

The 2,6-diesters of the third procedure given above are prepared by conversion of chelidamic acid according to C.A. 51, 2776 to diethyl 4-chloro-2,6-pyridinedicarboxylate of the formula

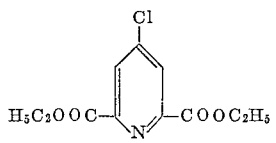

which is then reacted (a) with ammonia, amines, sodium alkoxides or sodium mercaptides, or (b) in the malonic ester synthesis with compounds of the formula

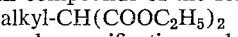

followed by the usual saponification and decarboxylation to give the desired diesters of 4-alkyl-2,6-pyridinedicarboxylic acids. When desired the chlorodiester is first reduced to the chlorodimethanol and then used in the malonic ester synthesis.

In an alternative procedure such diesters are converted to the diacids which are reacted as salts with a compound such as ethyl chloroformate to give a mixed anhydride which is then converted to the diazide by reaction with sodium azide. Such diazides are easily reduced to dimethanols by reaction with complex metal hydrides, e.g. with sodium borohydride.

Reference above to an abstract in Chemical Abstracts incorporates herein by reference the full text of the publication or patent of the abstract and also any pertinent references cited in such publication or patent.

The term "(lower)alkyl" as used herein refers to straight and branched chain saturated monovalent aliphatic hydrocarbon radicals having from one to ten carbon atoms inclusive, e.g. methyl, ethyl, propyl, isopropyl, butyl, normal and secondary and tertiary butyl, amyl, decyl, etc.

The preferred (lower)alkyl groups are those having from one to six carbon atoms. Similarly the term "(lower)alk-" in such terms as (lower)alkoxy and (lower)alkylamino limits the alkyl moiety of the latter radicals to the same alkyl group as defined above.

The (lower)alkanoyl isocyanates, e.g. acetyl isocyanate, n-butyryl isocyanate, used to make the compounds of the present invention are prepared according to the general methods described in the literature for such compounds, e.g. Billeter, Ber., 36, 3213 (1903); Speziale and Smith, J. Org. Chem., 28, 1805–1811 (1963); Hill and Degnan, J. Amer. Chem. Soc., 62, 1595 (1940), and appropriate references cited therein. Thus, the two preferred general methods utilize the reaction of an acyl chloride with silver cyanate and the reaction of an alkanoic acid amide with oxalyl chloride.

The mono-N-alkylcarbamates of the various pyridine 2,6-dimethanols are prepared by treatment of the alcohol with no more than one mole of the appropriate alkyl isocyanate followed by recrystallization to remove any bis-carbamate formed in the reaction. Suitable solvents or diluents are benzene, toluene, chlorobenzene, acetonitrile, chloroform, tetrahydrofuran and pyridine. The reaction is preferably carried out at a temperature of from room temperature to 150° C., especially at about the boiling point of the solvent or diluent. If necessary, a catalyst such as a tertiary amine (e.g., trimethylamine, triethylamine, N-alkylpiperidine, pyridine) or a metal alkoxide (e.g., potassium tert.-butoxide) may be used in the reaction. 2,6-pyridinedimethanol mono-N-methylcarbamate prepared in this manner was recrystallized twice from ethyl acetate and then twice from benzene to give colorless crystals, M.P. 91–92° C.

*Analysis.*—Calc'd for $C_9H_{12}N_2O_3$: C, 55.09; H, 6.17; N, 14.28. Found: C, 55.30; H, 6.27; N, 14.15.

The compounds of this invention are useful in the treatment of disease in animals, including particularly the higher animals such as man and horses, dogs, etc. The compounds are particularly useful in the treatment of inflammatory diseases, including purpura rheumatica and rheumatoid arthritis. The utility of the present compounds is enhanced by the absence of steroidal side effects and their lack of monoamine oxidase inhibiting activity.

The compounds can be administered parenterally, and preferably, orally. The compounds can be orally administered in the conventional forms, i.e., as tablets, capsules, suspensions, etc. The compounds of this invention can be combined in one dosage form with other therapeutically effective agents, including analgesics and the steroids which have also been used in the treatment of inflammatory disease.

The following examples are given in illustration, but not in limitation, of the present invention. All temperatures are given in degrees centigrade.

EXAMPLE 1 n-Butyryl isocyanate.—A solution of oxalyl chloride (26.2 g., 0.207 mole) in methylene chloride (50 ml.) was added dropwise to a stirred suspension of n-butyramide (18.0 g., 0.207 mole) in methylene chloride (75 ml.). The resulting yellow solution was heated under reflux for 17 hours. The methylene chloride was removed by distillation at atmospheric pressure and the residue distilled at atmospheric pressure through a 100 mm. Vigreux column. n-Butyryl isocyanate was collected as the fraction (11.4 g.) with a B.P. of 109–114° C. The product was a colorless liquid too reactive towards atmospheric moisture for satisfactory analytical data. An infrared spectrum showed strong absorption at ca. 2220 cm.$^{-1}$.

2,6-pyridinedimethanol di-(N-n-butyrylcarbamate).—n-Butyryl isocyanate (6.6 g., 0.0584 mole) was slowly added to a stirred suspension of 2,6-pyridinedimethanol (4.0 g., 0.0288 mole) in dry benzene (100 ml.). The mixture was heated under reflux for 20 minutes. The solid product, 2,6-pyridinedimethanol di-(N-n-butyrylcarbamate) (9.5 g.) was collected and recrystallized twice from ethanol to give colorless crystals, M.P. 196–198°.

*Analysis.*—Calc'd for $C_{17}H_{23}N_3O_6$: C, 55.88; H, 6.35; N, 11.50. Found: C, 56.00; H, 6.43; N, 11.60.

EXAMPLE 2

2,6-pyridinedimethanol di-(N-benzoylcarbamate).—A solution of benzoyl isocyanate (6.35 g., 0.0432 mole) in dry benzene (20 ml.) was slowly added to a stirred suspension of 2,6-pyridinedimethanol (3.0 g., 0.0216 mole) in dry benzene (25 ml.). The mixture was heated under reflux for 0.5 hour. The solid product (7.0 g.) was collected and recrystallized three times from an ethyl acetate-ethanol mixture to give 2,6-pyridinedimethanol di-(N-benzoylcarbamate) as colorless needles, M.P. 168.5–170.5°.

*Analysis.*—Calc'd for $C_{23}H_{19}N_3O_6$: C, 63.73; H, 4.42; N, 9.70. Found: C, 64.00; H, 4.68; N, 10.00.

EXAMPLE 3

2,6-pyridinedimethanol di-(N-acetylcarbamate).—A solution of acetyl isocyanate (4.8 g., 0.056 mole) in benzene (50 ml.) was added to a stirred suspension of 2,6-pyridinedimethanol (3.76 g., 0.027 mole) in benzene (50 ml.) at 30°. The mixture was heated under reflux for 20 minutes. The reaction mixture was cooled and filtered. The collected solid was recrystallized twice from methanol to give colorless crystals (3.0 g.), M.P. 180–181°.

*Analysis.*—Calc'd for $C_{13}H_{15}N_3O_6$: C, 50.48; H, 4.89; N, 13.59. Found: C, 50.30; H, 4.84; N, 13.65.

EXAMPLE 4

2,6-pyridinedimethanol N-acetyl-N'-methyldicarbamate.—A solution of acetyl isocyanate (3.0 g., 0.0353 mole) in benzene (30 ml.) was added to a suspension of 2,6-pyridinedimethanol mono-N-methylcarbamate (6.5 g., 0.0332 mole) in benzene (50 ml.). The mixture was heated under reflux for 10 minutes. The solid product (8.0 g.) was collected and recrystallized three times from ethanol to give 2,6-pyridinedimethanol N-acetyl-N'-methyldicarbamate as colorless crystals, M.P. 130–131°.

*Analysis.*—Calc'd for $C_{12}H_{15}N_3O_5$: C, 51.24; H, 5.38; N, 14.94. Found: C, 51.33; H, 5.36; N, 15.03.

EXAMPLE 5

2,6-pyridinedimethanol N-butyryl-N'-methyldicarbamate.—A solution of butyryl isocyanate (4.0 g., 0.0354 mole) in benzene (30 ml.) was added to a stirred suspension of 2,6-pyridinedimethanol mono-N-methylcarbamate (6.66 g., 0.034 mole) in benzene (65 ml.). The mixture was heated under reflux for one hour. The cooled reaction mixture was filtered and the collected product (9.0 g.) recrystallized three times from ethanol to give 2,6-pyridinedimethanol N-butyryl-N'-methyldicarbamate as colorless crystals, M.P. 133–134°.

*Analysis.*—Calc'd for $C_{14}H_{19}N_3O_5$: C, 54.36; H, 6.19; N, 13.59. Found: C, 54.40; H, 6.20; N, 13.72.

EXAMPLE 6

2,6-pyridinedimethanol N-benzoyl-N'-methyldicarbamate.—A solution of benzoyl isocyanate (2.25 g., 0.0153 mole) in benzene (25 ml.) was slowly added to a suspension of 2,6-pyridinedimethanol mono-N-methylcarbamate (3.0 g., 0.0153 mole) in benzene (25 ml.) which was being heated under reflux. Refluxing was continued for a further 0.5 hour. The solid product which was collected from the cooled reaction mixture was recrystallized three times from aqueous methanol to give 2,6-pyridinedimethanol N-benzoyl-N'-methyldicarbamate as colorless needles, (2.5 g.), M.P. 122–124° (melting and resolidifying at 66–68°).

*Analysis.*—Calc'd for $C_{17}H_{17}N_3O_5$: C, 59.47; H, 4.99; N, 12.24. Found: C, 58.75; H, 5.05; N, 11.95.

While in the foregoing specifications various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:

1. A member selected from the group consisting of compounds of the formula

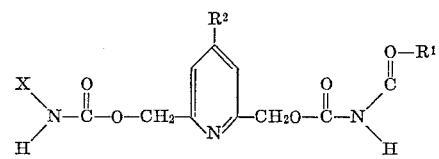

wherein $R^1$ is a member selected from the group consisting of (lower)alkyl and phenyl and X is a member selected from the group consisting of

and (lower)alkyl and $R^2$ is a member selected from the group consisting of hydrogen, chloro, bromo, iodo, fluoro, trifluoromethyl, (lower)alkyl and (lower)alkoxy; and a nontoxic, pharmaceutically acceptable acid addition salt thereof.

2. A compound of the formula

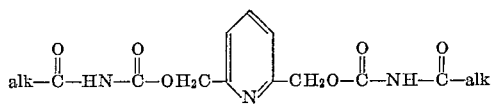

wherein alk represents (lower)alkyl.

3. A compound of the formula

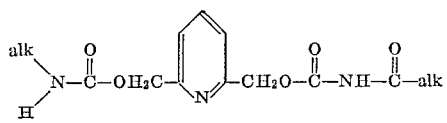

wherein alk represents (lower)alkyl.

4. A compound of the formula

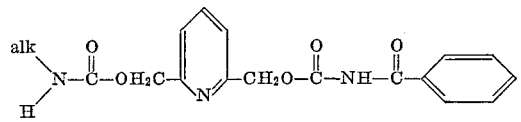

wherein alk represents (lower)alkyl.

5. A compound of the formula

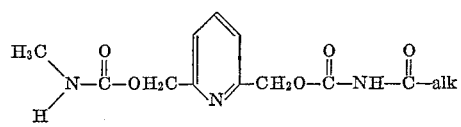

wherein alk represents (lower)alkyl.

6. The compound of the formula

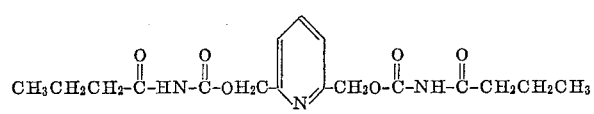

7. The compound of the formula

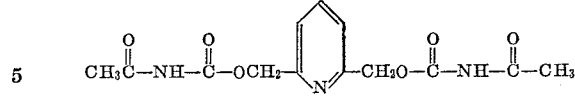

8. The compound of the formula

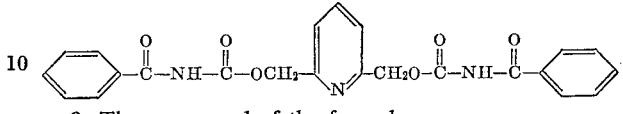

9. The compound of the formula

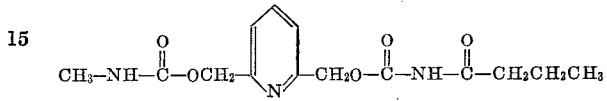

10. The compound of the formula

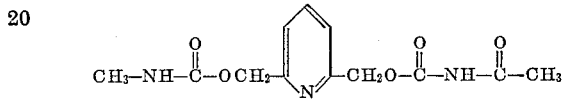

11. The compound of the formula

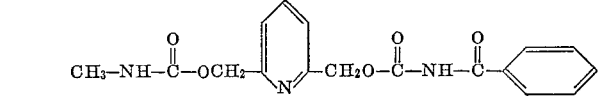

References Cited

FOREIGN PATENTS 646,457  4/1964  Belgium.

HENRY R. JILES, *Primary Examiner.*

A. L. ROTMAN, *Assistant Examiner.*

U.S. Cl. X.R.

167—65; 260—290, 297